United States Patent
Wilson et al.

(10) Patent No.: US 10,949,788 B2
(45) Date of Patent: Mar. 16, 2021

(54) SYSTEMS AND METHODS FOR SOCIAL INFLUENCE BASED LOYALTY AND CUSTOMER EXPERIENCE MANAGEMENT IN MOBILE COMMUNICATION NETWORKS

(71) Applicant: Flytxt BV, Nieuwegein (NL)

(72) Inventors: Jobin Wilson, Kothamangalam (IN); Prateek Kapadia, Mumbai (IN)

(73) Assignee: FLYTXT BV, Nieuwegein (NL)

( * ) Notice: Subject to any disclaimer, the term of this patent is extended or adjusted under 35 U.S.C. 154(b) by 357 days.

(21) Appl. No.: 15/078,383

(22) Filed: Mar. 23, 2016

(65) Prior Publication Data
US 2016/0283884 A1    Sep. 29, 2016

(30) Foreign Application Priority Data
Mar. 23, 2015    (IN) ............................ 1453/CHE/2015

(51) Int. Cl.
| | |
|---|---|
| *G06Q 10/06* | (2012.01) |
| *G06Q 50/00* | (2012.01) |
| *H04L 29/08* | (2006.01) |
| *G06Q 30/02* | (2012.01) |

(52) U.S. Cl.
CPC ... *G06Q 10/06393* (2013.01); *G06Q 30/0204* (2013.01); *G06Q 50/01* (2013.01); *H04L 67/306* (2013.01)

(58) Field of Classification Search
CPC .............................................. C06Q 10/06393
USPC ....................................................... 705/7.39
See application file for complete search history.

(56) References Cited

U.S. PATENT DOCUMENTS

| | | | | |
|---|---|---|---|---|
| 9,031,888 B2 * | 5/2015 | Lawrence | ............... | G06Q 50/01 706/46 |
| 9,342,624 B1 * | 5/2016 | Ojha | ..................... | G06Q 10/10 |
| 2012/0254184 A1 * | 10/2012 | Choudhary | ........ | G06Q 30/0201 707/738 |
| 2013/0041860 A1 * | 2/2013 | Lawrence | .......... | G06Q 30/0201 706/46 |

(Continued)

OTHER PUBLICATIONS

IBM, Method for Application Installation Based on Physical Location, IP.com Journal, Aug. 26, 2009 (Year: 2009).*

*Primary Examiner* — Patricia H Munson
*Assistant Examiner* — Chesiree A Walton
(74) *Attorney, Agent, or Firm* — Mannava & Kang, P.C.; Vinay Malik

(57) ABSTRACT

Embodiments herein provide a method and system that determines an underlying social network from user interaction graphs based on mobile service usage and derive social influence scores for various contexts based on user interaction parameters. The present disclosure pertains to a method of determining social influence score for a user of a social network, said method comprising creating, using a social network analyzer, a social graph based on usage data generated by a plurality of users, said usage data being obtained from a mobile communication network, wherein vertices of the created social graph represent the plurality of users along with edge weights that are based on weighted linear or non-linear combinations of key performance indicators (KPIs) representing actions made by each user; and deriving, by the social network analyzer, influencer score for each user in the social graph based on user interactions from online social networks and mobile interaction patterns.

8 Claims, 5 Drawing Sheets

(56) References Cited

U.S. PATENT DOCUMENTS

| | | | | |
|---|---|---|---|---|
| 2013/0073568 A1* | 3/2013 | Federov | ............. | G06Q 30/0269 |
| | | | | 707/749 |
| 2013/0132938 A1* | 5/2013 | Agarwal | ................... | G06F 9/44 |
| | | | | 717/173 |
| 2014/0095257 A1* | 4/2014 | Lewis | ................ | G06Q 30/0202 |
| | | | | 705/7.31 |
| 2014/0149418 A1* | 5/2014 | Qin | ........................ | G06Q 50/01 |
| | | | | 707/740 |
| 2014/0237570 A1* | 8/2014 | Shishkov | .............. | G06F 21/316 |
| | | | | 726/7 |
| 2014/0337340 A1* | 11/2014 | Yang | ...................... | G06Q 50/01 |
| | | | | 707/737 |

* cited by examiner

SYSTEMS AND METHODS FOR SOCIAL INFLUENCE BASED LOYALTY AND CUSTOMER EXPERIENCE MANAGEMENT IN MOBILE COMMUNICATION NETWORKS

CROSS REFERENCES TO RELATED APPLICATIONS

This application claims the benefit of Indian Provisional Application No. 1453/CHE/2015 filed on Mar. 23, 2015 entitled "System and Method for social influence based loyalty and customer experience management in wireless communication networks", contents of which are incorporated by reference herein.

TECHNICAL FIELD

This invention relates to mobile communication networks, and more particularly to improving experience of customers using mobile communication networks.

BACKGROUND

Currently, users go online for social interactions using social networks such as Facebook, Twitter, Instagram, Whatsapp, Google+, Snapchat, Linkedin and so on. The users can use the Internet to access these networks, wherein the users can access these networks using a LAN (Local Area Network), a mobile communication network (such as a mobile network) or any other equivalent means. The user can use devices such as mobile phones, tablets, computers (with wireless communication adapters (dongles), wearable computing devices, and so on to access the networks using the mobile communication networks.

In the case of social networks, users have to explicitly define and maintain their social networks. The user's use of data connections across mobile communication networks allow implicit discovery and maintenance of the underlying social network(s) from the interaction graph (considering interactions among users and/or services), which can be used for ranking users for loyalty management, targeted advertising, churn management, QoS (Quality of Service) management and so on, based on different aspects of user interactions (time of interactions, duration of interactions, frequency of interactions, location, OTT (Over The Top) applications or services consumed in common and so on.

Existing solutions use aspects such as social graph discovery from call data records, marketing using social networks and social churn management in mobile networks in a separate manner, with no integration between these aspects. Existing solutions do not generate a context neutral influencer score, which could be utilized by downstream analytics systems to optimize diverse business objectives (for example, churn management, campaign target discovery and so on). Existing solutions are manual/semi-automatic and do not combine connectivity structure obtained from diverse sources such as online social networks, email networks etc. with mobile user interaction data.

A key question like "if I have to give away a great offer to a limited set of users in such a way that its cumulative impact (direct+indirect) is maximum, who should be targeted?" is difficult to answer with conventional solutions. Conventional marketing solutions focus on user's observable properties or behavior represented by key performance indicators (KPIs).

BRIEF DESCRIPTION OF FIGURES

This invention is illustrated in the accompanying drawings, through out which like reference letters indicate corresponding parts in the various figures. The embodiments herein will be better understood from the following description with reference to the drawings, in which.

DETAILED DESCRIPTION

Figure 1:
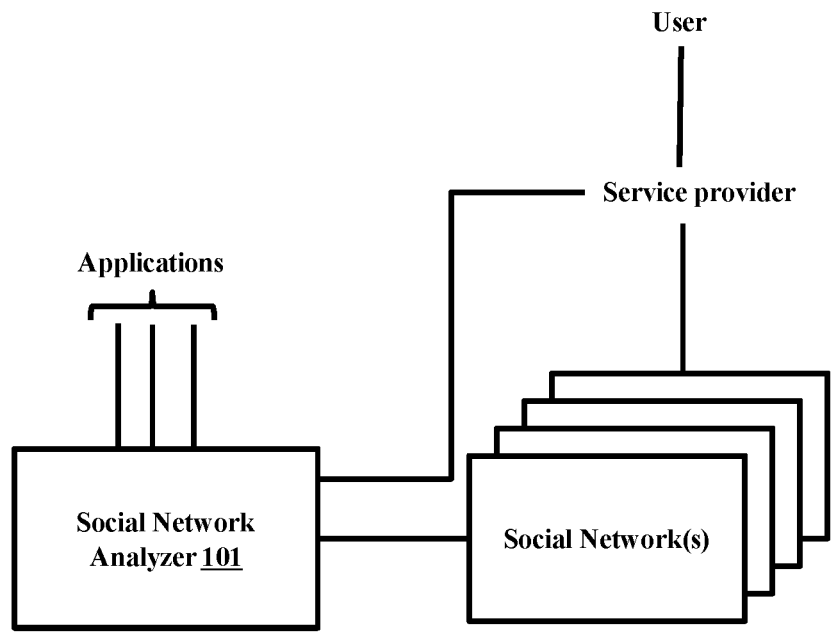
FIG. 1 depicts a system configured to derive social influence scores, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve an integrated method and system that determines an underlying social network from user interaction graphs from mobile service usage and then deriving social influence scores for various contexts based on user interaction parameters. Referring now to the drawings, and more particularly to FIGS. 1 through 6, where similar reference characters denote corresponding features consistently throughout the figures, there are shown preferred embodiments.

Embodiments herein disclose a method and system for automatically deriving social influence scores in large mobile interaction graphs, considering different aspects of user behavior and interactions simultaneously.

Embodiments herein use user interaction data external to the service provider, such as data from online social networks and professional networks can be used to enrich the interaction data to arrive at estimates of influence scores of mobile users and using the influence scores for mobile user ranking for loyalty management and customer experience management.

Embodiments herein disclose an integrated model that determines the underlying social network from user interaction graphs from mobile service usage and then deriving influencer scores for various contexts based on user interaction parameters (for example, time of interaction, nature and frequency of interaction, degree of overlap in OTT applications used, number of times co-located and so on), for loyalty and customer experience management (CEM).

Embodiments herein consider the underlying implicit social network structure along with user KPIs (Key Performance Indicators) to improve loyalty and customer experience management campaigns. The determined social network structure could be enriched by combining it with the online social network structure, assuming entity de-duplication is achieved using user KPIs such as location, demographic information, top friends. Entity de-duplication can also be achieved by mapping mobile users to their online social identities through customized mobile applications installed on the user's mobile device(s).

FIG. 1 depicts a system configured to derive social influence scores. The system, as depicted comprises of a social network analyzer 101. The social network analyzer 101 can be connected to at least one social network. At least one user can access the social networks using a suitable device such as a mobile phone, a tablet, a computer, a wearable computing device, and so on and connect to the social network using a mobile communication network (such as a mobile communication network). The social network analyzer 101 can enable at least one application such as multi-level marketing, churn prediction, loyalty management, CEM (Customer Experience Management) and so on, to connect to the social network analyzer 101 and utilize scores, as generated by the social network analyzer 101.

Figure 2:
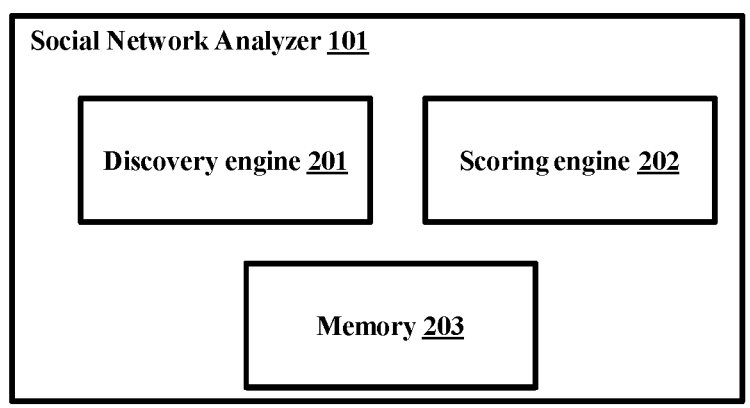
FIG. 2 illustrates the social network analyzer, according to embodiments as disclosed herein.

FIG. 2 depicts the social network analyzer. The social network analyzer 101 comprises of a discovery engine 201, a scoring engine 202, and a memory 203. The social network analyzer 101 can be configured to fetch data from at least one social network. The fetched data can comprise of data from the service providers about the user. The data can comprise of at least one of interactions among users, systems, applications and contexts within the mobile communication network(s). The data can further comprise of the discovered social network augmented with auxiliary data from other online sources such as online social network or public data sources (for example, from geographic map data with Global Positioning System (GPS) coordinates having classification such as residential area, commercial area etc.; users getting implicitly connected based on the area/type of the area they visit). The data can comprise of weight parameters and/or business rules. The discovery engine 201 can create an implicit social graph using the data related to the users from the social networks. The data can comprise of data from the service providers about the user. The data can comprise of weight parameters and/or business rules. The discovery engine 201 can represent the users as vertices within the social graph, wherein the edge weights can be determined based on the business rules/weight parameters. The discovery engine 201 can determine the business rules/weight parameters based on the application context of the influencer rank score being derived. The business rules/weight parameters can comprise of a plurality of aspects of user interactions such as number of interactions made, time of interaction, total duration of interaction, number of overlapping mobile applications and OTT (Over-The-Top) applications used, number of times users were co-located (using location data) and so on. Examples of the business rules/weight parameters can be at least one of number of messages to a specific number/set of number(s)/users within a specific area/at specific periods of time, number of calls to a specific number/set of number(s)/users within a specific area and so on.

An example for determining edge weights is described below. Assume that user interaction data is available in the format depicted in Table 1 below, wherein Table 1 comprises of sample mobile service usage events.

TABLE 1

| Sl No | A-Party | B-Party | Start Time | End Time | Event Type | Description |
|---|---|---|---|---|---|---|
| 1 | 1000 | 2000 | 12/10/2014 22:30 | 12/10/2014 22:34 | Voice Call | ILD |
| 2 | 1000 | NA | 12/10/2014 19:10 | 12/10/2014 19:11 | App Download | Skype |
| 3 | 2000 | NA | 12/10/2014 20:22 | 12/10/2014 20:22 | App Download | Skype |
| 4 | 1000 | NA | 12/10/2014 23:50 | 12/10/2014 23:50 | Location Change | BTS_ID_012 (University) |
| 5 | 3000 | NA | 12/10/2014 23:55 | 12/10/2014 23:55 | Location Change | BTS_ID_012 (University) |
| 6 | 3000 | NA | 12/10/2014 23:58 | 12/10/2014 23:58 | App Download | Skype |
| 7 | 3000 | NA | 12/10/2014 23:59 | 12/10/2014 23:59 | App Download | Firefox |
| 8 | 3000 | NA | 13/10/2014 00:05 | 13/10/2014 00:05 | WAP Browse | www.youtube.com |

The discovery engine 201 can derive KPIs from the user interaction data, which can be utilized for calculating edge weights in the interaction graph. For instance, consider that the user interaction data is related to number of OTT applications, which are downloaded by two users who have historically interacted over the mobile network in the recent past. For example, as depicted in Table 1, users 1000 and 3000 have changed their location to a common base transceiver station (BTS) prior to user 3000 downloading the OTT application "Skype", (which user 1000 has also downloaded historically); number of such OTT applications downloaded in common could be a derived KPI.

Consider an example for influencer scoring from an OTT application penetration perspective. The discovery engine 201 can determine "influencers" who can propagate OTT application usage behavior in the mobile network and pose a threat to conventional revenue streams of mobile operators. Embodiments herein want to identify top influencers and reward/incentivize them using a customized loyalty program, so that OTT customers could be won-back as well as the threat posed by rapid penetration such applications could be addressed.

For calculating edge weights between two users A & B, the discovery engine 201 can count the number of OTT applications downloaded by a user B after it has been downloaded by User A previously (within a configurable window of observation such as 3 days). The discovery engine 201 can also check if user A and B have interacted (sharing common location, voice calls, text messages etc.) at least once over the mobile network in the past 2 weeks (configurable period) for an edge to be considered from A to B.

The above is just an example and the discovery engine 201 can use arbitrary variants involving weighted linear or non-linear combinations of different KPIs representing various aspects of user interaction; for example, a function of number of voice calls made, call duration, number of common locations visited, number of common Uniform Resource Locator (URLs) browsed and so on. The actual procedure for calculating edge weights by the discovery engine 201 can be configurable based on the business rules and the application context.

On the discovery engine 201 creating the social graph, the scoring engine 202 can derive influencer scores from the social graph by applying a suitable method and its configuration parameters to the social graph. In an example, consider that the iterative method "PAGERANK™" is used, then a configuration parameter could be the "damping factor" which determines how much of the influence score within the network would be propagated through the real edges of the graph; the remaining scores will be uniformly distributed to each of the nodes at the end of every iteration. In another example, consider that data from two online social networks is available along with call based network data. An edge weight between "User 1" and "User 2" could be in this case a weighted sum from these networks. In this case, the weights would be the parameters (indicating what kind of a linear combination results in the edge weight in our hybrid graph). The scoring engine 202 can use a suitable method such as Eigen vector centrality (PAGERANK™), Degree Centrality or a function of multiple centrality indices derived from the social graph or an augmented version of it, wherein the scoring engine 202 can consider user interactions from online social networks along with the mobile interaction patterns. The scoring engine 202 can derive social influence scores corresponding to each user. The scoring engine 202 can algorithmically generate and/or rank "derived KPIs" and/or specifying customized scoring procedures, to improve properties of the mined hybrid social network to make it suitable for one or more business applications.

The discovery engine 201 can store the social graph in at least one suitable location (such as the memory 203). The scoring engine 202 can store the scores in at least one suitable location (such as the memory 203). The memory 203 can be at least one of a local memory, an internal memory, an external memory (such as an external memory storage means), a network storage means (such as a file server, a data server, and so on), an online storage location, the Cloud, and so on.

The social network analyzer 101 can refine the discovered/augmented social network based on business rules/marketer defined heuristics to adapt the social network to particular business objectives such as loyalty management, customer experience management, multi-level marketing etc.

Figure 3:
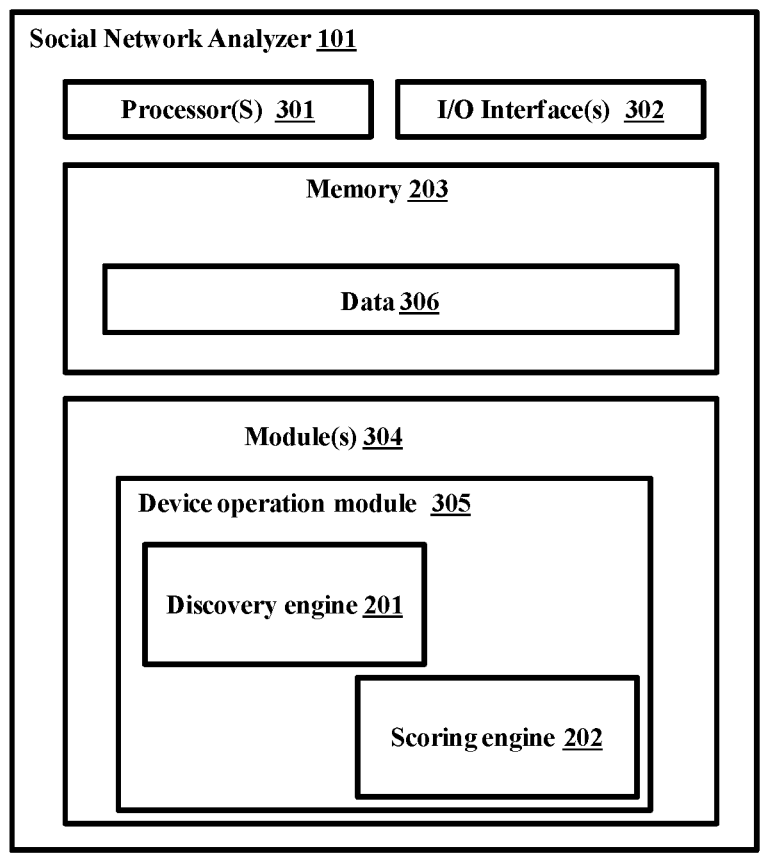
FIG. 3 illustrates a plurality of components of the social network analyzer for determining an underlying social network from user interaction graphs from mobile service usage and then deriving social influence scores for various contexts, according to embodiments as disclosed herein.

FIG. 3 illustrates a plurality of components of the social network analyzer for determining an underlying social network from user interaction graphs from mobile service usage and then deriving social influence scores for various contexts. Referring to FIG. 3, the social network analyzer is illustrated in accordance with an embodiment of the present subject matter. In an embodiment, the social network analyzer may include at least one processor 301, an input/output (I/O) interface 302 (herein a configurable user interface), and a memory 203. The at least one processor 102 may be implemented as one or more microprocessors, microcomputers, microcontrollers, digital signal processors, central processing units, state machines, logic circuitries, and/or any devices that manipulate signals based on operational instructions. Among other capabilities, the at least one processor 301 is configured to perform functionalities as defined by the functional modules (the discovery engine 201 and the scoring engine 202).

The I/O interface 302 can include a variety of software and hardware interfaces, for example, a web interface, a graphical user interface such as a display screen, and the like. The I/O interface 302 can allow the social network analyzer 101 to communicate with other devices and/or networks (such as social networks). The I/O interface 302 can facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and so on. The modules 304 include routines, programs, objects, components, data structures, and so on, which perform particular tasks, functions or implement particular abstract data types. In one implementation, the modules 304 can include a device operation module 305. The device operation module 305 can comprise of the functional modules and can be configured to allow the user to perform one or more tasks such as creating the social graph and deriving social influencer scores from the social graph. The modules 304 can further include programs or coded instructions that supplement applications and functions of the electronic device 100.

The data 306, amongst other things, serves as a repository for storing data processed, received, and generated by one or more of the modules 304. Further, the names of the other components and modules of the social network analyzer 101 are illustrative and need not be construed as a limitation.

Figure 4:
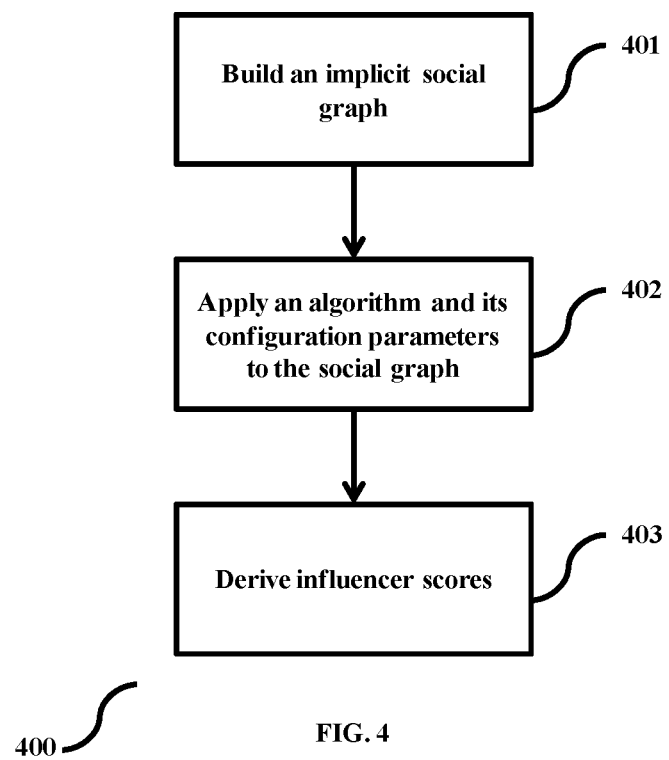
FIG. 4 is a flowchart illustrating the process of generating social influence scores, according to embodiments as disclosed herein.

FIG. 4 is a flowchart illustrating the process of generating social influence scores, according to embodiments as disclosed herein. The social network analyzer 101 creates (401) a social graph using the data related to the users from the social networks. The data can further comprise of data from the service providers about the user. The data can comprise of weight parameters and/or business rules. The social network analyzer 101 represents the users as vertices within the social graph, wherein the edge weights are determined based on the business rules/weight parameters. The business rules/weight parameters are decided based on the application context of the influencer rank score being derived. The business rules/weight parameters can comprise of a plurality of aspects of user interactions such as number of interactions made, time of interaction, total duration of interaction, number of overlapping mobile applications and OTT applications used, number of times users were co-located (using location data) and so on. Once the implicit social graph is created, the social network analyzer 101 applies (402) a suitable method and its configuration parameters to the social graph and derives (403) influencer scores from the social graph. The various actions in method 400 can be performed in the order presented, in a different order or simultaneously. Further, in some embodiments, some actions listed in FIG. 4 may be omitted.

A small worked out example of influencer ranking procedure in the OTT application penetration context is described below. Assume a mobile network with 8 users. The determined implicit social graph based on service usage data is described in Table 2.

TABLE 2

|  | User1 | User2 | User3 | User4 | User5 | User6 | User7 | User8 |
|---|---|---|---|---|---|---|---|---|
| User1 | 0 | 1 | 0 | 2 | 0 | 1 | 1 | 0 |
| User2 | 0 | 0 | 5 | 3 | 0 | 1 | 0 | 1 |
| User3 | 0 | 4 | 0 | 1 | 0 | 1 | 1 | 0 |
| User4 | 0 | 0 | 0 | 0 | 1 | 1 | 0 | 1 |
| User5 | 0 | 0 | 0 | 1 | 0 | 0 | 0 | 3 |
| User6 | 0 | 0 | 0 | 2 | 0 | 0 | 0 | 0 |
| User7 | 3 | 1 | 1 | 2 | 0 | 1 | 0 | 0 |
| User8 | 0 | 0 | 0 | 1 | 4 | 0 | 0 | 0 |

Figure 5:
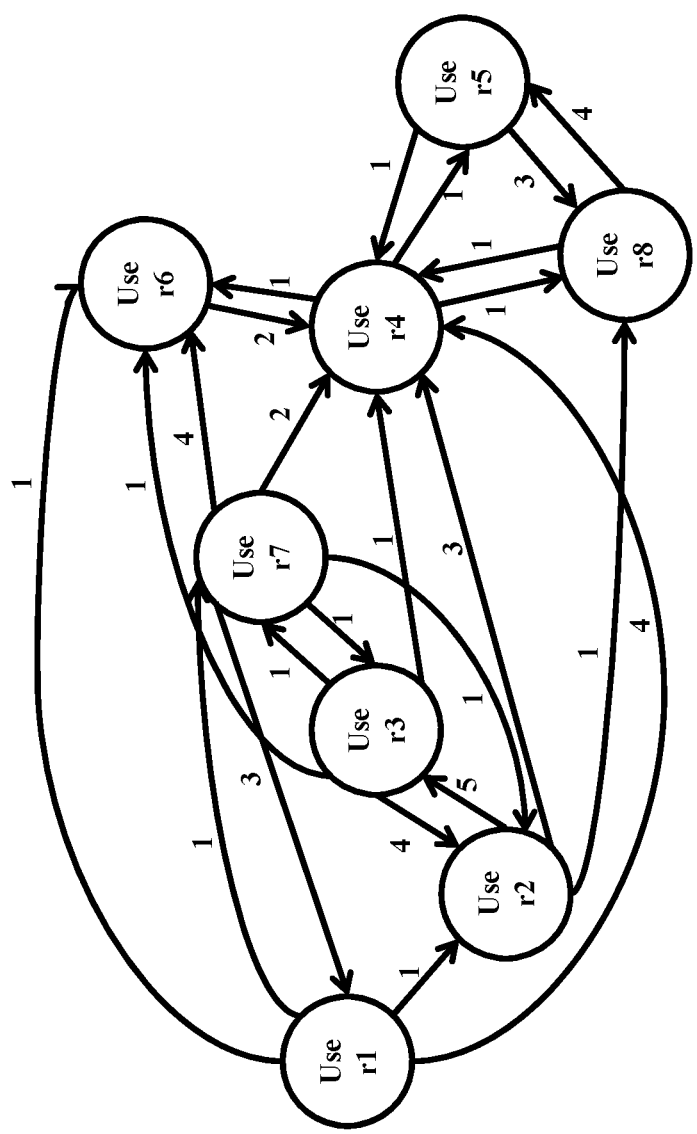
FIG. 5 is an example visualization of an implicit social graph, according to embodiments as disclosed herein.
Figure 6:
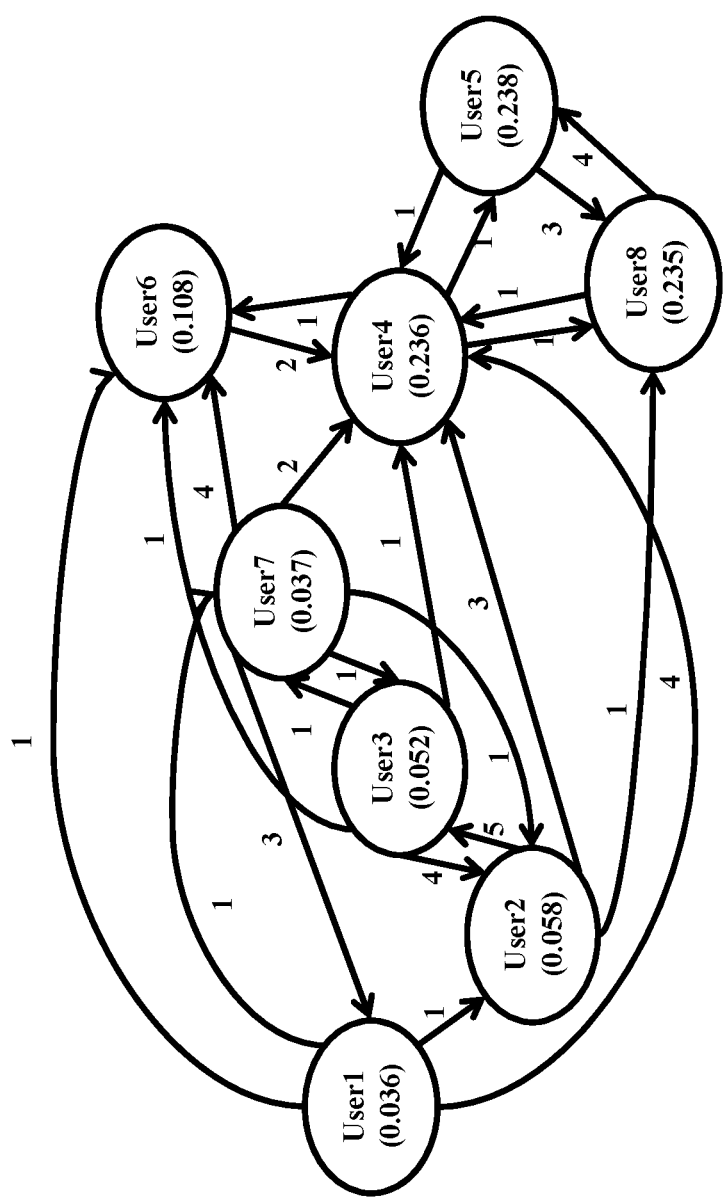
FIG. 6 is an example visualization of influencer ranking scores, according to embodiments as disclosed herein.

The representation is in the form of an adjacency matrix (as depicted in table 2) and the edge weights are determined as described earlier. FIG. 5 visualizes the graph. The influencer score is derived corresponding to each user using Eigenvector centrality (page rank) on the user interaction graph data. The determined influencer ranking scores are visualized in FIG. 6. It can be observed that user 5 turns out to be most influential in this context, which cannot be trivially determined based on the degree of the vertex alone. The calculation of influencer score based on PAGERANK™ is as described below while not converged:

for each vertex v rank(v)=sum of ranks from incoming edges

It can be observed that User 5, User 4 and User 8 are the top three influencers based on the determined implicit social network from the underlying user interaction graph. The derived influencer score can be used to improve downstream analytics models for churn management, CLV (Customer Lifetime Value) calculation, loyalty management, social network structure based multi-level marketing schemes etc.

The influencer detection approach, as disclosed herein is generic and can be used for other applications such as expert detection in mailing lists, forums, co-authorship networks, and social network analytics (SNA) based hybrid models that consider user's online social networking behavior along with the implicit social graph determined from mobile service usage data.

Embodiments herein disclose an approach for scoring mobile users based on social influence, implicitly determined from user interaction graph data.

Embodiments herein disclose a social influence based loyalty model, facilitating accumulation and propagation of loyalty points based on automatically determined influence score and social network structure.

Embodiments herein provide an score for the user, which can be used in multiple applications such as loyalty management (for example, users with high influencer scores are treated as loyal brand ambassadors and provided with delight offers), churn management (for example, users with high influence scores are given more aggressive retention offers if they are detected as potential churners by a churn prediction model) and so on.

Embodiments herein disclose a context neutral social influence scoring model which can improve downstream analytics models with diverse objectives (churn prediction, customer life time value estimation and so on).

Embodiments herein improve the effectiveness of marketing activities conducted by service providers for customer experience management, loyalty management and churn management by utilizing the implicit social network structure, which can be mined from the user interaction graphs. Detecting social influence scores and community structure within user interaction graphs can be used to extend the traditional "word of mouth publicity" concept to digital campaigns.

Embodiments herein have the ability to scale up horizontally to handle any volumes of data.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method for determining an influence score for a first user of a plurality of users of a network, said method comprising:

creating, by a discovery engine of a social network analyzer that comprises a processor and a memory, a usage interaction graph based on mobile service usage data generated by interactions of the plurality of users in a mobile communication network, vertices of the social usage interaction graph representing the plurality of users and edge weights of the usage interaction graph being based on a plurality of weight parameters of at least one analytical model;

determining, by the discovery engine, download of an Over-The-Top (OTT) application by the first user at a first time instance;

upon determination of the download of the OTT application by the first user, initially detecting, by the discovery engine, at a second time instance, co-location of a second user of the plurality of users with the first user within a first defined time frame from the first time instance, and subsequently detecting, at a third time instance, relative to the co-location of the second user with the first user, download of the OTT application by the second user within a second defined time frame from the second time instance;

determining, by the discovery engine, an edge weight between the first user and the second user in the interaction graph based on the detection of the co-location within the first defined time frame and the detection of the download of the OTT application by the second user within the second defined time frame, wherein said edge weight is determined further based on a combination of time and duration of interactions between the first user and the second user, nature and frequency of interactions between the first user and the second user, degree of overlap in OTT applications used by the first user and the second user, and number of times the first user and the second user are co-located, and wherein the edge weight is determined using weighted combinations of key performance indicators (KPIs) derived from the usage data; and deriving and updating, by a scoring engine of the social network analyzer, simultaneous to changes in the usage interaction graph and said edge weight, the influence score for the first user in the usage interaction graph based on the download of the OTT application by the second user within said second defined time frame from the second time instance.

2. The method of claim 1, wherein during the combination of the usage interaction graph and the online social network structure, de-duplication is performed by mapping the plurality of users of the mobile communication network with their respective social identities that form part of the online social network structure.

3. The method of claim 1, wherein the usage data comprises at least one of the interactions among any or a combination of the plurality of users, systems, applications, contexts within the mobile communication network, auxiliary data from online sources; online social networks; and public data sources.

4. The method of claim 1, wherein deriving the influence score for the first user in the social graph uses at least one of Eigen vector centrality, Degree Centrality, and a function of multiple centrality indices derived from the social graph.

5. A system for determining an influence score for a first user of a plurality of users of a network, said system implemented in a social network analyzer comprising a processor coupled with a memory, the memory storing instructions executable by the processor to:

create, by a discovery engine of the social network analyzer, a usage interaction graph based on mobile service usage data generated by interactions of the plurality of users in a mobile communication network, vertices of the social usage interaction graph representing the plurality of users and edge weights of the usage interaction graph being based on a plurality of weight parameters of at least one analytical model;

determine, by the discovery engine, download of an Over-The-Top (OTT) application by the first user at a first time instance;

upon determination of the download of the OTT application by the first user, initially detect, by the discovery engine, at a second time instance, co-location of a second user of the plurality of users with the first user within a first defined time frame from the first time instance, and subsequently detect, at a third time instance, relative to the co-location of the second user with the first user, download of the OTT application by the second user within a second defined time frame from the second time instance;

determine, by the discovery engine, an edge weight between the first user and the second user in the interaction graph based on the detection of the co-location within the first defined time frame and the detection of the download of the OTT application by the second user within the second defined time frame, wherein said edge weight is determined further based on a combination of time and duration of interactions between the first user and the second user, nature and frequency of interactions between the first user and the second user, degree of overlap in OTT applications used by the first user and the second user, and number of times the first user and the second user are co-located, and wherein the edge weight is determined using weighted combinations of key performance indicators (KPIs) derived from the usage data; and derive and update, by a scoring engine of the social network analyzer, simultaneous to changes in the usage interaction graph and said edge weight, the influence score for the first user in the usage interaction graph based on the download of the OTT application by the second user within said second defined time frame from the second time instance.

6. The system of claim 5, wherein during the combination of the usage interaction graph and the online social network structure, de-duplication is performed by mapping the plurality of users of the mobile communication network with their respective social identities that form part of the online social network structure.

7. The system of claim 5, wherein the usage data comprises at least one of the interactions among any or a combination of the plurality of users, systems, applications, contexts within the mobile communication network, auxiliary data from online sources; online social networks; and public data sources.

8. The system of claim 5, wherein deriving the influence score for the first user in the social graph uses at least one of Eigen vector centrality, Degree Centrality, and a function of multiple centrality indices derived from the social graph.

* * * * *